US012499734B2

(12) United States Patent
Delekta

(10) Patent No.: US 12,499,734 B2
(45) Date of Patent: *Dec. 16, 2025

(54) ELECTRONIC GAMING MACHINE AND METHOD WITH TRANSFORMABLE GRID PICK SELECTIONS AND MULTI-STATE REVEAL MECHANICS

(71) Applicant: Aristocrat Technologies, Inc. (ATI), Las Vegas, NV (US)

(72) Inventor: Scott Delekta, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 9 days.

This patent is subject to a terminal disclaimer.

(21) Appl. No.: 18/662,113

(22) Filed: May 13, 2024

(65) Prior Publication Data

US 2024/0296716 A1 Sep. 5, 2024

Related U.S. Application Data

(63) Continuation of application No. 17/689,501, filed on Mar. 8, 2022, now Pat. No. 12,020,542, which is a continuation of application No. 16/885,201, filed on May 27, 2020, now Pat. No. 11,276,277.

(51) Int. Cl.
*G07F 17/32* (2006.01)

(52) U.S. Cl.
CPC ...... *G07F 17/3258* (2013.01); *G07F 17/3213* (2013.01); *G07F 17/3265* (2013.01)

(58) Field of Classification Search
CPC .. G07F 17/32; G07F 17/3213; G07F 17/3258; G07F 17/3265; G07F 17/34
See application file for complete search history.

(56) References Cited

U.S. PATENT DOCUMENTS

| | | | | |
|---|---|---|---|---|
| 5,704,835 A * | 1/1998 | Dietz, II | G07F 17/3265 | 463/20 |
| 7,252,589 B1 * | 8/2007 | Marks | G07F 17/3265 | 463/16 |
| 7,393,278 B2 * | 7/2008 | Gerson | G07F 17/3265 | 273/138.2 |
| 8,708,806 B2 * | 4/2014 | Wabschall | G07F 17/34 | 463/20 |
| 8,974,290 B2 * | 3/2015 | Gomez | G07F 17/3258 | 463/16 |
| 11,276,277 B2 * | 3/2022 | Delekta | G07F 17/3258 | |
| 12,020,542 B2 * | 6/2024 | Delekta | G07F 17/3213 | |
| 2007/0232382 A1 * | 10/2007 | Berman | G07F 17/3244 | 463/20 |

(Continued)

*Primary Examiner* — Milap Shah
(74) *Attorney, Agent, or Firm* — Greenberg Traurig, LLP

(57) ABSTRACT

A gaming machine comprising a plurality of grid positions, and a game controller to at least: randomly populate a plurality of grid positions with one of a plurality of grid symbols, receive one or more selections of the plurality of grid positions, resulting a plurality of unselected grid positions, reveal a plurality of unrevealed symbols at each of the plurality of grid positions selected, in response to a first grid position selected revealing the first symbol, repopulate the first grid position with one of a plurality of chance symbols including the first symbol and the second symbol, and in response to the first grid position selected revealing the second symbol, determine a first award based on the second symbol.

20 Claims, 14 Drawing Sheets

(56) References Cited

U.S. PATENT DOCUMENTS

| | | | | |
|---|---|---|---|---|
| 2010/0190544 | A1* | 7/2010 | Thomas | G07F 17/34 463/20 |
| 2014/0221079 | A1* | 8/2014 | Rucker | G07F 17/34 463/21 |
| 2015/0302703 | A1* | 10/2015 | Nelson | G07F 17/3262 463/20 |
| 2016/0104345 | A1* | 4/2016 | MacGregor | G07F 17/3239 463/20 |
| 2017/0148275 | A1* | 5/2017 | Berman | G07F 17/3225 |
| 2018/0102020 | A1* | 4/2018 | You | G07F 17/3267 |
| 2018/0130286 | A1* | 5/2018 | Berman | G07F 17/3244 |
| 2018/0268659 | A1* | 9/2018 | Chesworth | G07F 17/3267 |
| 2019/0304255 | A1* | 10/2019 | San | G07F 17/34 |
| 2021/0233360 | A1* | 7/2021 | Hiten | G07F 17/3213 |
| 2021/0295654 | A1* | 9/2021 | Kiss | G07F 17/3213 |

* cited by examiner

ELECTRONIC GAMING MACHINE AND METHOD WITH TRANSFORMABLE GRID PICK SELECTIONS AND MULTI-STATE REVEAL MECHANICS

RELATED APPLICATIONS

The present application is a continuation of and claims priority to U.S. patent application Ser. No. 17/689,501, and entitled "Electronic Gaming Machine and Method with Transformable Grid Pick Selections and Multi-State Reveal Mechanics," which is a continuation of and claims priority to U.S. patent application Ser. No. 16/885,201, filed May 27, 2020, and entitled "Electronic Gaming Machine and Method with Transformable Grid Pick Selections and Multi-State Reveal Mechanics," which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical wagering games use a random number generator (RNG) to randomly determine the outcome of each game. The wagering game is designed to return a certain percentage of the amount wagered back to the player (RTP=return to player) over the course of many plays or instances of the game. The RTP and randomness of the RNG are critical to ensuring the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

Conventional pick games end after selected grid symbols have been displayed. A player either wins a prize after picking a grid symbol, or often leaves wondering if the player could have won anything if the player had chosen different grid positions. In other words, there is no mechanism in the conventional pick games to both have a wide selection of picks and allow players to perceive their chances of winning a larger prize.

SUMMARY

Systems, devices, machines, and methods for an interactive electronic gaming machine with a grid selection mechanic disclosed that includes a chance of added free grid spins and a total grid reveal feature. The electronic grid selection mechanic interactively allows a player to select a designated number of grid positions on a grid arranged in rows and columns.

When the grid positions selected reveal an eligible symbol or symbols for re-spin, the interactive electronic grid game transforms the grid positions with the eligible symbols into independent reels that may be spun. These reels may have various standard and non-standard symbols, including the eligible symbols for re-spin and additional winning symbols. The symbols on the generated reels may be different and having different weights. In effect, the grid positions with independent reels that may be spun expands the existing pick grid symbols presented and awards available without increasing the size of the pick grid displayed to the player by adjusting probabilities for the pick but at the same time avoiding the need of overly complicating one or more lookup tables, such as pay tables.

More specifically, an eligible symbol or symbols for re-spin allows the player to select the eligible symbol to then spin the reel at that symbol position. Such re-spin provides a second chance to the player that results in a random selected symbol, which may include another eligible symbol. All or some smaller number of eligible symbol positions may be spun. In some embodiments, the spinning reels spin a predetermined number of times until one or more winning symbols are revealed. If a symbol not eligible for re-spin replaces an eligible symbol during a re-spin, then the number of re-spins could be reset to a predetermined number. After the predetermined number of times of spinning or winning symbols have been revealed, the interactive electronic grid game determines an award based on prizes associated with the winning symbols revealed. An additional feature of the game is that the interactive electronic grid game also reveals prizes hidden behind grid symbols that were not selected. That way, the player knows what prizes and/or jackpots the player might have selected to win a prize if other grid positions were selected.

Specifically, in some examples, an electronic gaming machine that may be used in regulated game play is disclosed. The gaming machine includes a credit input operable to establish a credit balance, and a display operable to display a plurality of grid positions. The gaming machine also includes a game controller comprising at least one processor and a memory storing a plurality of grid symbols including a first symbol type and a second symbol type, a plurality of chance symbols including the first symbol type and the second symbol type, and instructions. The instructions, when executed, cause the processor to at least randomly populate the plurality of grid positions with one of the plurality of grid symbols based on one or more random numbers generated from a random number generator, receive one or more selections of the plurality of grid positions to reveal the first symbol type or the second symbol type at the plurality of grid positions selected, in response to at least one grid position of the plurality of grid positions selected revealing the first symbol type, repopulate with an individual reel the at least one grid position having the first symbol type, the individual reel comprising the plurality of chance symbols, control the individual reel to spin to a random stop on one symbol of the plurality of chance symbols based on a second set of random numbers, determine an award based on the second symbol type at each of the plurality of grid positions selected, and control the display to display, in an inactive state, each grid symbol at each of the plurality of grid positions not selected after completing a designated number of re-spins.

In another example, the instructions, when executed, cause the processor to credit a biggest jackpot when a number of the plurality of grid positions selected that display the second symbol type reaches a predetermined maximum number of the second symbol type corresponding to the biggest jackpot.

In one example, the instructions, when executed, cause the processor to reveal a second award associated with an unselected grid position that could have been won when the unselected grid position reveals the second symbol type.

In one example, the instructions, when executed, cause the processor to, when the at least one grid position having the first symbol type is being repopulated, animate a transformation of the at least one grid position into the individual reel.

In one example, the instructions, when executed, cause the processor to display a spinning of the individual reel, and reveal the one symbol selected when the spinning of the individual reel comes to a stop.

In one example, the instructions, when executed, cause the processor to repopulate the plurality of grid positions that reveal the first symbol type simultaneously.

In yet another example, the instructions, when executed, cause the processor to repopulate the plurality of grid positions that reveal the first symbol type, one grid position at a time.

In yet another example, the instructions, when executed, cause the processor to repopulate the at least one grid position a predetermined number of times.

In yet another example, the instructions, when executed, cause the processor to repopulate the at least one grid position a predetermined number of times unless the at least one grid position that has been repopulated displays the second symbol type.

In one example, the instructions, when executed, cause the processor to, when the one or more selections include a first plurality of grid positions, to reveal a first plurality of symbols at the first plurality of grid positions selected simultaneously after all of the one or more selections have been received.

In a further example, the instructions, when executed, cause the processor to, when the one or more selections include a first plurality of grid positions, and wherein the instructions, to reveal each of a first plurality of symbols at the first plurality of grid positions selected, after each of the one or more selections has been received.

In one example, the instructions, when executed, cause the processor to randomly determine the award associated with the second symbol type from a plurality of available awards.

In one example, the instructions, when executed, cause the processor to credit a sum of respective awards revealed through the plurality of grid positions that reveal the second symbol type.

In one example, the instructions, when executed, cause the processor to permit a predetermined number of grid position selections less than the plurality of grid positions.

In an example, the instructions, when executed, cause the processor to utilize different weights for the individual reel for each of the designated number of re-spins.

In one example, the instructions, when executed, cause the processor to set the designated number of re-spins for each of the first symbol type revealed, and to reset the designated number of re-spins when the individual reel reveals the second symbol type during one of the designated number of re-spins.

In an example, the instructions, when executed, cause the processor to reveal at each of the plurality of grid positions not selected only after all of the one or more selections have been received.

In one example, the second symbol type includes at least one of a credit value and a jackpot.

In an example, the first symbol type does not result in any award.

In an example, the instructions, when executed, cause the processor to prohibit each of the plurality of grid positions not selected from being selected after the one or more selections have been received.

repopulate the at least one grid position a predetermined number of times unless the at least one grid position that has been repopulated displays the second symbol.

In a further example, the one or more selections include a first plurality of grid positions, and the instructions, when executed, cause the processor to reveal a first plurality of symbols at the first plurality of grid positions selected simultaneously after all of the one or more selections have been received.

In yet another example, the one or more selections include a first plurality of grid positions, and the instructions, when executed, cause the processor to reveal each of a first plurality of symbols at the first plurality of grid positions selected, after each of the one or more selections has been received.

In one example, the instructions, when executed, cause the processor to credit a jackpot when all of plurality of grid positions selected display the second symbol.

In one example, the instructions, when executed, cause the processor to randomly determine the first award associated with the second symbol from a plurality of available awards.

In yet still another example, the instructions, when executed, cause the processor to credit a sum of respective awards revealed through the plurality of grid positions that reveal the second symbol.

In one example, the instructions, when executed, cause the processor to permit a predetermined number of grid position selections less than the plurality of grid positions.

Figure 1:
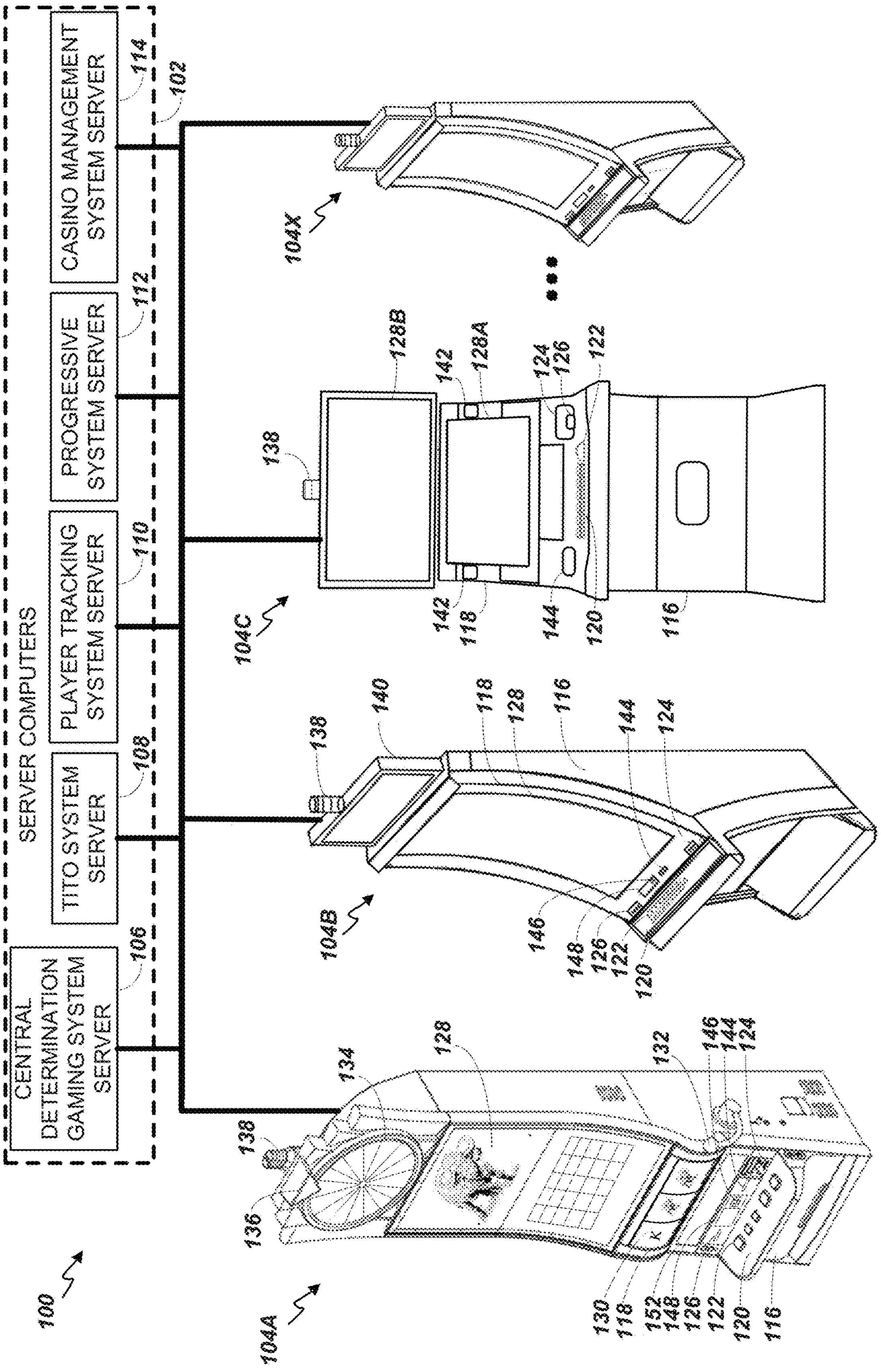
FIG. 1 is an exemplary diagram showing several EGMs networked with various gaming-related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present disclosure is not limited to the arrangements and instrumentality shown in the attached drawings.

DETAILED DESCRIPTION

Embodiments of the present disclosure represent an improvement in the art of electronic gaming machines, systems, and software for such electronic gaming machines or systems. Specifically, the present disclosure describes various innovations in user interface ("UI") features of electronic gaming machines ("EGMs"), as well as innovations in features of backend processing for EGMs to implement the UI features. For example, at least some embodiments of the present disclosure provide an improved grid pick selection mechanic for use with an improved grid in wager-regulated grid pick game plays, where a player picks one or more grid positions to reveal one or more prizes winnable in the improved grid. The improved grid pick selection mechanics generally provide players with additional opportunities to win prizes by utilizing a re-spin mechanic selection and a full item grid reveal when a pick game round ends.

By way of further example, in some embodiments, when the player has picked or selected a number of grid positions from the improved grid, the selected grid positions display symbols that may include, for example, various standard and non-standard symbols, including the eligible symbols for re-spin and winning symbols. As described further below, each of the symbols may be different and have different weights that enhances control of the pick grid game selection mechanic. Unlike existing grid games where presentation and selection of grid symbols mark an end of the existing grid games, the improved grid makes grid positions display eligible symbols for a predetermined number of second chances. In some embodiments, the second chances are presented in the form of a number of re-spins. For example, a grid position that displays an eligible symbol may be transformed into a reel that may spun in that symbol position. Upon spinning of the reel, the reel may be spun to display either an eligible symbol for re-spin or a winning symbol for a predetermined or randomly determined plurality of times.

In effect, employing a reel in the symbol position improves grid pick mechanics by dynamically maintaining the return to player (RTP) associated with the generated reel without having to visually expand the pick grid to accommodate all the added symbol positions afforded by a reel. This display configuration and operative mechanic expands the grid for prize awards without increasing the size of the pick grid displayed unwieldly to a player and enables a wider array of prize opportunities in the grid pick game.

Another feature of the grid pick selection mechanic is that, when the number of re-spins has completed, a full grid reveal occurs that allows a player to observe and realize the near miss potential, or, put another way, to appreciate what other selections in a disabled state that might have been made to result in a win. Thus, embodiments of the present disclosure are not simple game rules that set forth with probabilities or RTP nor do they simply new display static symbol patterns. Instead, the grid selection mechanic provides technologic improvements in the art of pick grid selection mechanics in electronic gaming devices or machines, and software for such electronic gaming devices or machines. Moreover, the above example is not intended to be limiting, but merely exemplary, of technological improvements provided by some embodiments of the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
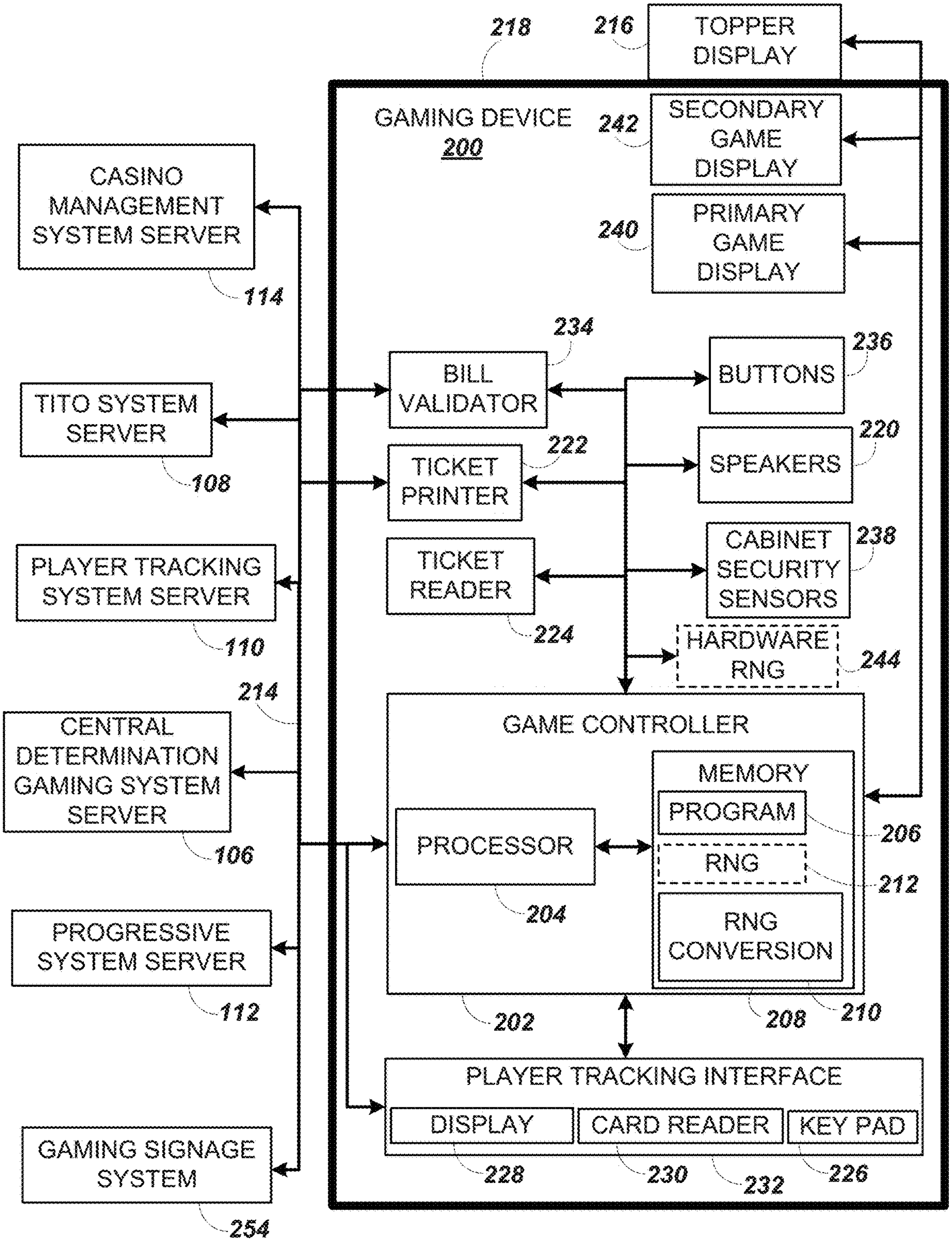
FIG. 2A is a block diagram showing various functional elements of an example EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game displays 240 and secondary game display 242. Other game and prize information may also be displayed.

For each game instance, a player may make selections, which may affect the play of the game. For example, the player may vary the total amount wagered by selecting the amount bet per line and the number of lines played. In many games, the player is asked to initiate or select options during the course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

Figure 2B:
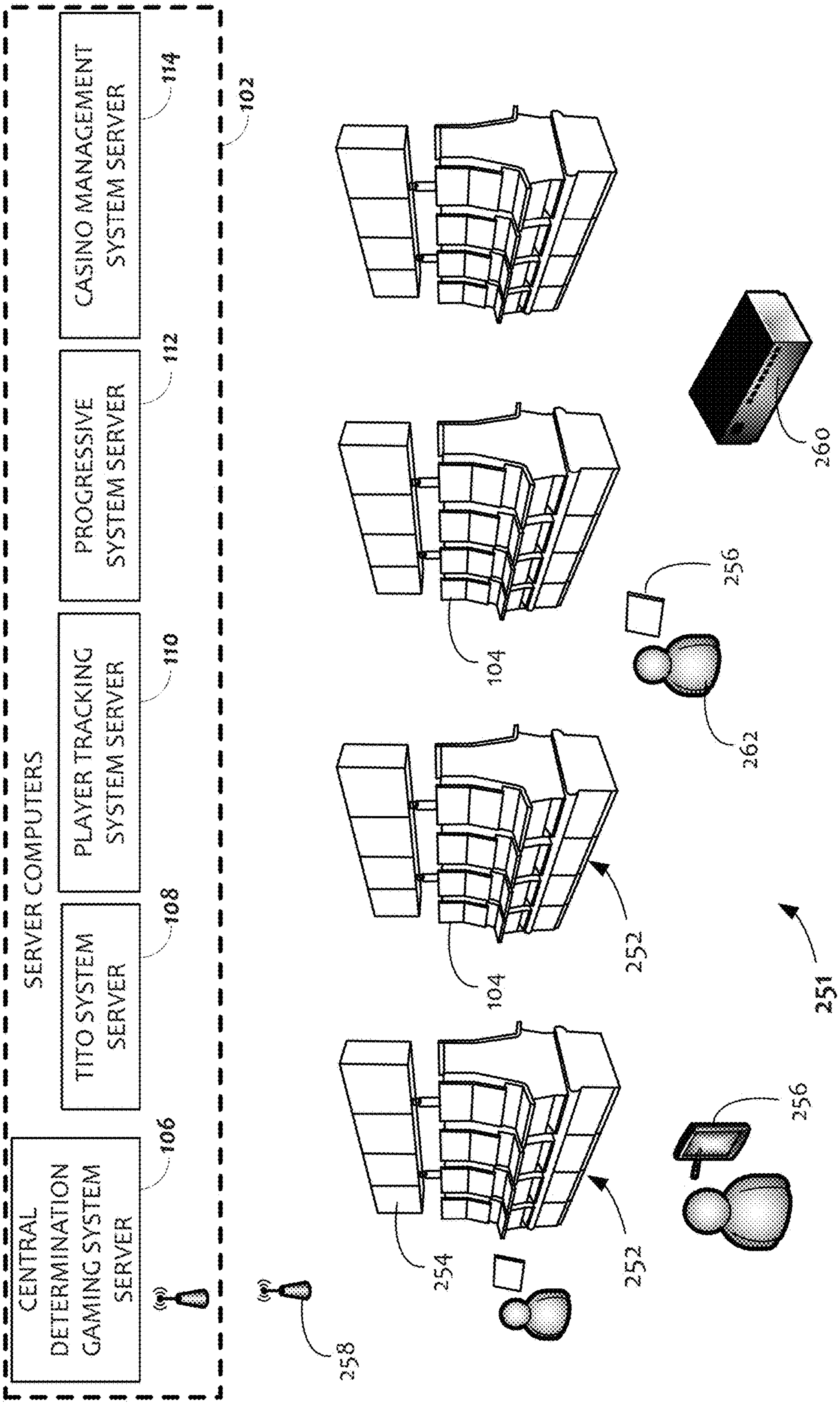
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
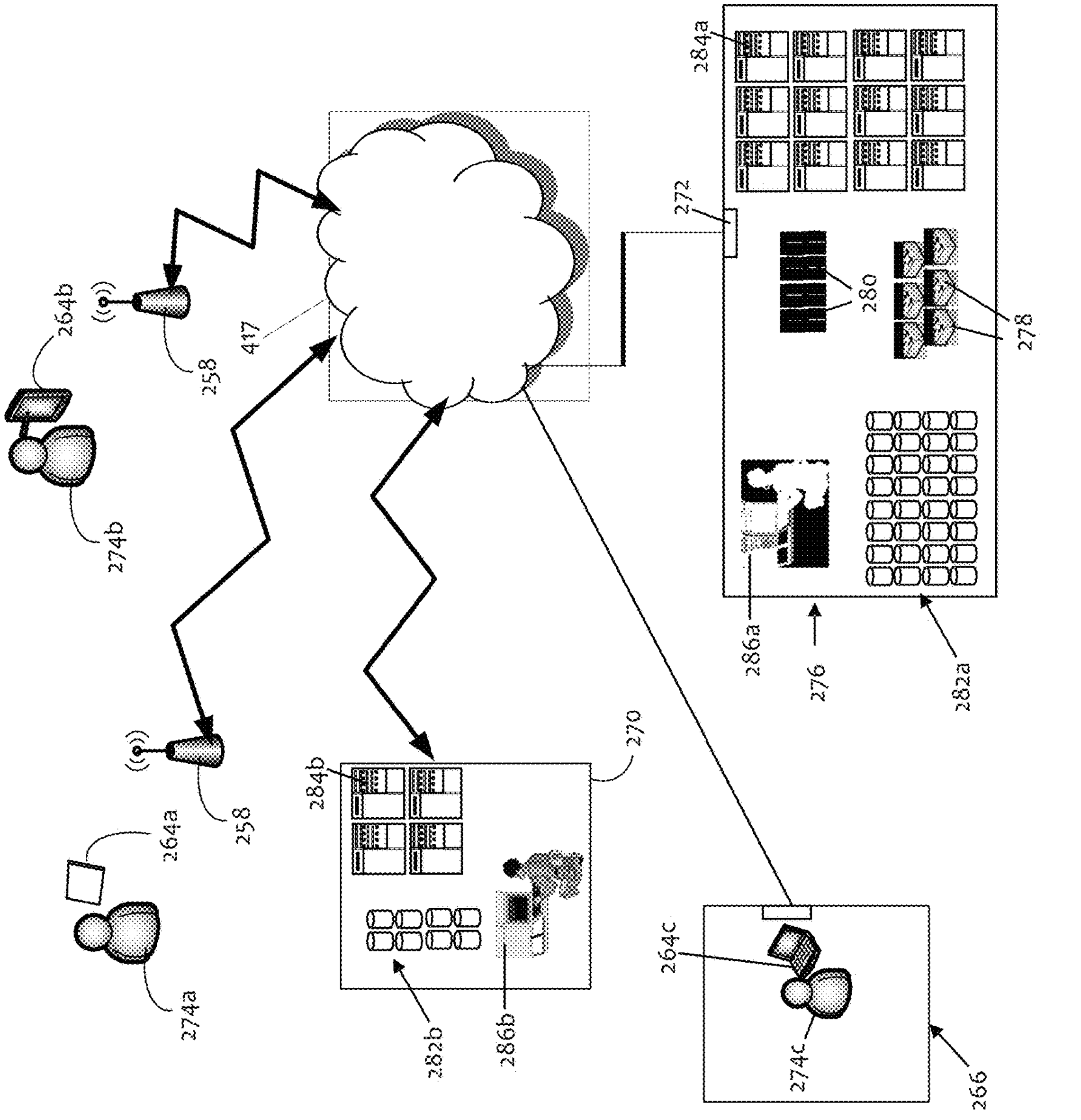
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
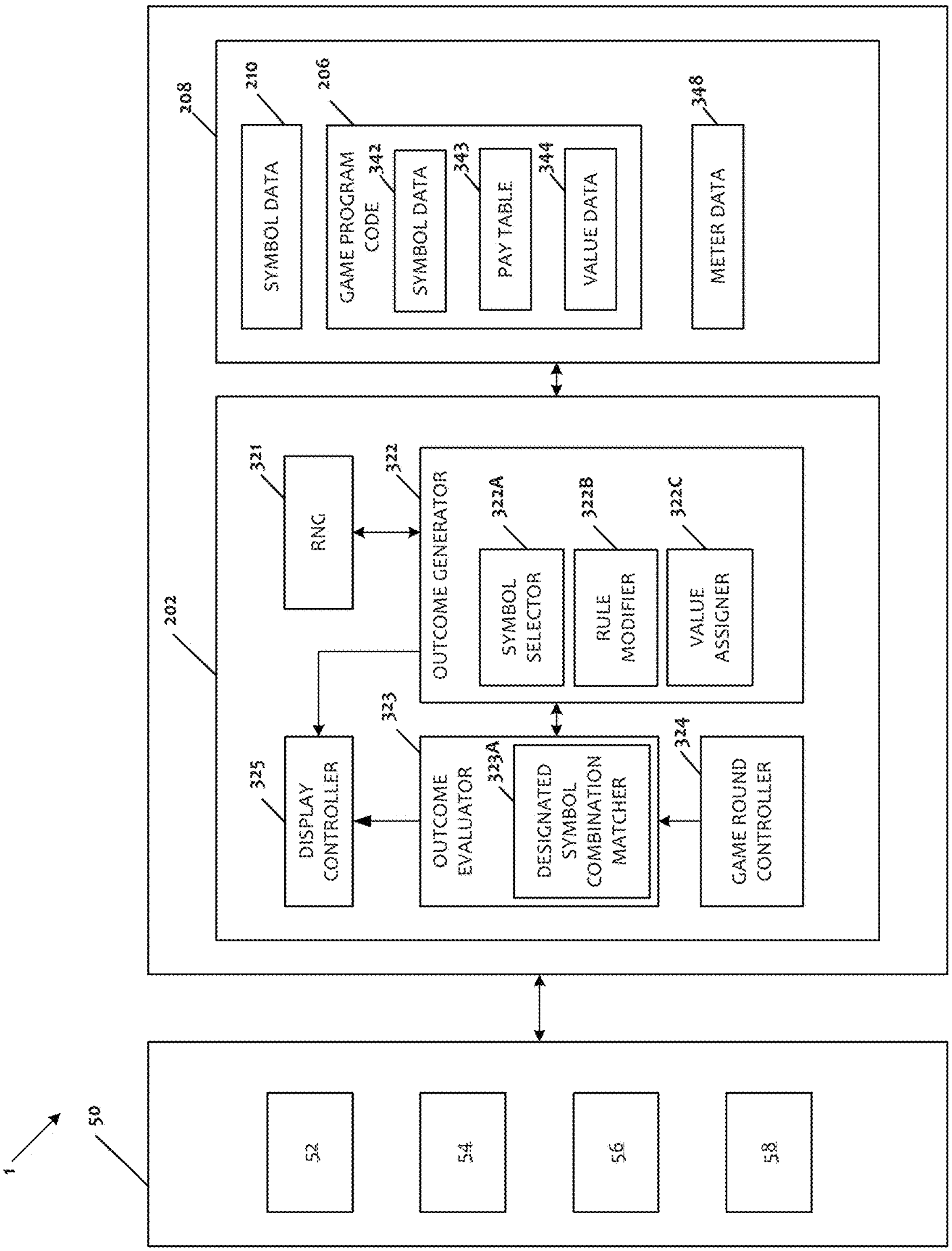
FIG. 3A is a further block diagram showing various functional elements of an embodiment of the game controller of FIG. 2A.

In FIG. 3A, the processor 204 of game controller 202 of gaming device 200 is shown implementing a number of modules based on game program code 206 stored in memory 208. Persons skilled in the art will appreciate that several of the modules could be implemented in some other way, for example, by a dedicated circuit. The game controller 202 is an example of what may be referred to herein as a "control system." In some implementations, the control system also may include the memory 208. Other examples of control systems are disclosed herein.

According to this example, these modules include an outcome generator 322 which operates in response to the player's operation of player input buttons 236 to place a wager and initiate a play of the game and generates a game outcome which will then be evaluated by outcome evaluator 323. In some examples, the first part of forming the game outcome may be for a symbol selector 322A to select symbols from a set of symbols specified by symbol data 342 using a RNG 321. The selected symbols may be advised to the display controller 325, which causes them to be displayed as a symbol display on primary game display 240 at a set of display positions.

In certain embodiments, the symbol data 342 includes one or more virtual reels that correspond to one or more reels displayed by the primary game display 240. The virtual reels may include an arrangement of symbols selected from symbol data 342 in, for example, a predetermined or random manner. The symbol selector 322A may select a stop position for the one or more virtual reels based on one or more outcomes of the RNG 321. The stop position of the one or more reels then determines the symbols that are selected on the primary game display 240. In some alternative implementations, the functionality of one or more of the modules shown in FIG. 3A may be implemented in another device, e.g., in a server. For example, the functionality of the RNG 321, the outcome generator 322, the outcome evaluator 323 and/or the game round controller 324 may be implemented in a device that is configured for communication with the gaming device 200.

In the embodiment described below, the display positions of the symbol display are arranged in a rectangular matrix comprising a plurality of columns and a plurality of rows. However, other arrangements known in the gaming industry could be employed in embodiments of the disclosure. For example, in some arrangements, there are more symbols in some columns than in others, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighboring reel.

Figure 3B:
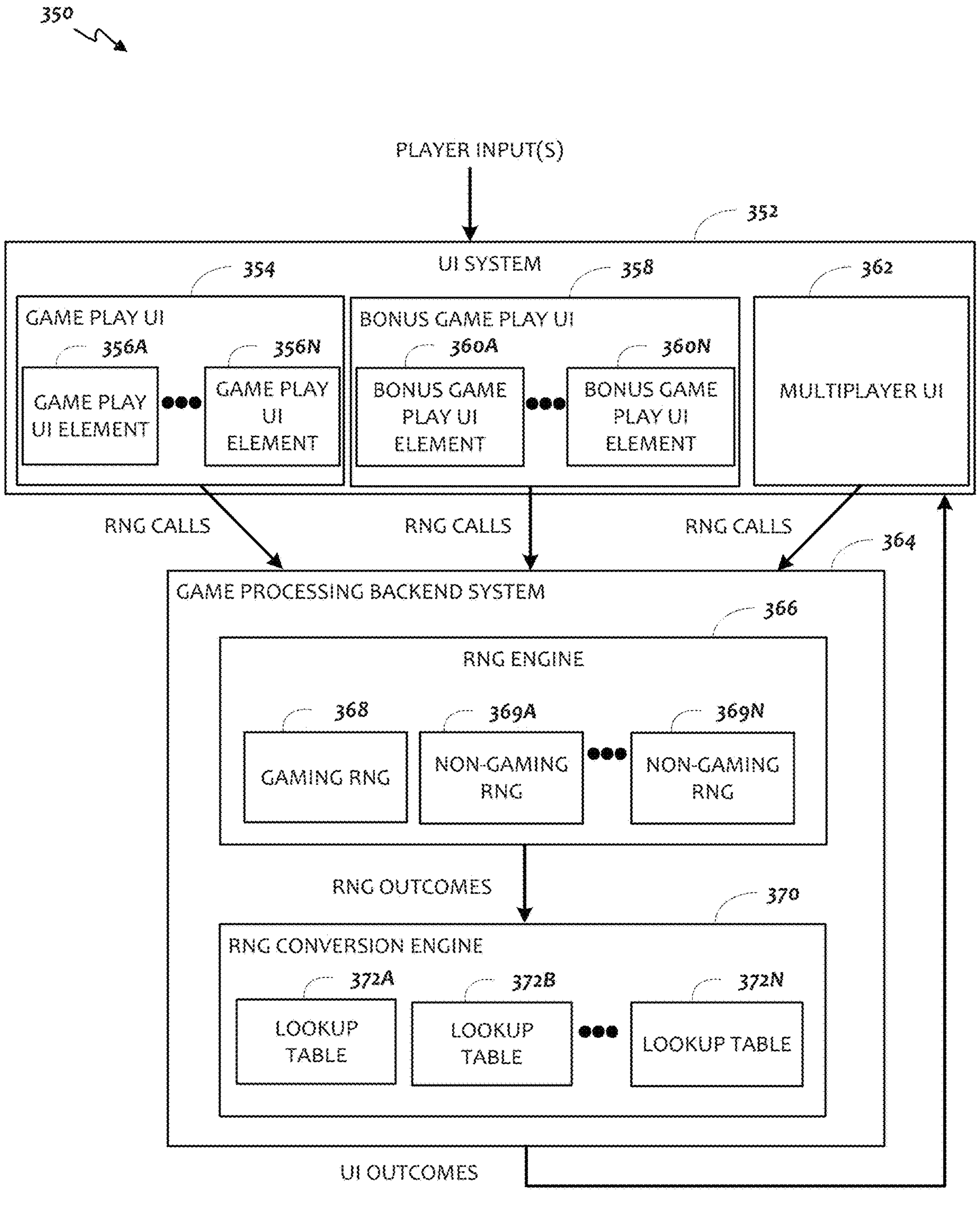
FIG. 3B illustrates, in block diagram form, an embodiment of a game processing architecture algorithm that implements a game processing pipeline for the play of a game in accordance with various embodiments described herein.

FIG. 3B illustrates, in block diagram form, an embodiment of a game processing architecture 350 that implements a game processing pipeline for the play of a game in accordance with various embodiments described herein. As shown in FIG. 3B, the gaming processing pipeline starts with having a UI system 352 receive one or more player inputs for the game instance. Based on the player input(s), the UI system 352 generates and sends one or more RNG calls to a game processing backend system 364. Game processing backend system 364 then processes the RNG calls with RNG engine 366 to generate one or more RNG outcomes. The RNG outcomes are then sent to the RNG conversion engine 370 to generate one or more game outcomes for the UI system 352 to display to a player. The game processing architecture 350 can implement the game processing pipeline using a gaming device, such as gaming devices 104A-104X and 200 shown in FIGS. 1 and 2, respectively. Alternatively, portions of the gaming processing architecture 350 can implement the game processing pipeline using a gaming device and one or more remote gaming devices, such as central determination gaming system server 106 shown in FIG. 1.

The UI system 352 includes one or more UIs that a player can interact with. The UI system 352 could include one or more game play UIs 354, one or more bonus game play UIs 358, and one or more multiplayer UIs 362, where each UI type includes one or more mechanical UIs and/or graphical UIs (GUIs). In other words, game play UI 354, bonus game play UI 358, and the multiplayer UI 362 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3B as an example, the different UI elements are shown as game play UI elements 356A-356N and bonus game play UI elements 360A-360N.

The game play UI 354 represents a UI that a player typically interfaces with for a base game. During a game instance of a base game, the game play UI elements 356A-356N (e.g., GUI elements depicting one or more virtual reels) are shown and/or made available to a user. In a subsequent game instance, the UI system 352 could transition out of the base game to one or more bonus games. The bonus game play UI 358 represents a UI that utilizes bonus game play UI elements 360A-360N for a player to interact with and/or view during a bonus game. In one or more embodiments, at least some of the game play UI elements 356A-356N are similar to the bonus game play UI elements 360A-360N. In other embodiments, the game play UI element 356A-356N can differ from the bonus game play UI elements 360A-360N.

FIG. 3B also illustrates that UI system 352 could include a multiplayer UI 362 purposed for game play that differs or is separate from the typical base game. For example, multiplayer UI 362 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 366 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3B does not explicitly depict that multiplayer UI 362 includes UI elements, multiplayer UI 362 could also include one or more multiplayer UI elements.

Based on the player inputs, the UI system 352 could generate RNG calls to a game processing backend system 364. As an example, the UI system 352 could use one or more application programming interfaces (APIs) to generate the RNG calls. To process the RNG calls, the RNG engine 366 could utilize gaming RNG 368 and/or non-gaming RNGs 369A-369N. Gaming RNG 368 corresponds to RNG 212 shown in FIG. 2A. As previously discussed with reference to FIG. 2A, gaming RNG 368 often performs specialized and non-generic operations that comply with regulatory and/or game requirements. For example, because of regulation requirements, gaming RNG 368 could be a cryptographic random or pseudorandom number generator (PRNG) (e.g., Fortuna PRNG) that securely produces random numbers for one or more game features. To generate random numbers, gaming RNG 368 could collect random data from various sources of entropy, such as from an operating system (OS) and/or a hardware based RNG (not showing in FIG. 3B). Alternatively, non-gaming RNGs 369A-369N may not be cryptographically secure and/or be computationally less expensive. Non-gaming RNGS 369A-369N can, thus, be used to generate outcomes for non-gaming purposes. As an example, non-gaming RNGs 369A-369N can generate random numbers for such as generating random messages that appear on the gaming device.

The RNG conversion engine 370 processes each RNG outcome from RNG engine 366 and converts the RNG outcome to a UI outcome that is feedback to the UI system 352. With reference to FIG. 2A, RNG conversion engine 370 corresponds to RNG conversion engine 212 used for game play. As previously described, RNG conversion engine 370 translates the RNG outcome from the RNG 212 to a game outcome presented to a player. RNG conversion engine 370 utilizes one or more lookup tables 372A-372N to regulate a prize payout amount for each RNG outcome and how often the gaming device pays out the derived prize payout amounts. In one example, the RNG conversion engine 370 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game. In various embodiments, RNG 212 could be a physical device such as a co-processor with memory that executes instructions to generate random numbers. In certain embodiments, RNG 212 could be implemented in processor 204.

The likelihood of a threshold count of target symbols landing for a reel can be managed using a lookup table. Different windows can use different lookup tables, so as to vary the likelihood of the threshold count of target symbols landing for the different windows. One or more lookup tables can also be used to manage which values of target symbols appear in reels. This section describes examples of various types of lookup tables.

FIG. 3B also shows examples of lookup tables 372A . . . 372N, which are also called weighted tables. In general, a lookup table can be implemented as any data structure that assigns probabilities to different options, in order for one of the different options to be selected using a random number. Different options are represented in different entries of a lookup table. The probabilities for different options can be reflected in threshold values (e.g., for a random number RND, generated by an RNG, in the range of 1<RND<=40 for option 1, 40<RND<=70 for option 2, 70<RND<=90 for option 3, and 90<RND<=100 for option 4, given four options and RND is a random number, where 0<RND<=100). The threshold values can represent percentages or, more generally, sub-ranges within the range for a random number. In some example implementations, the threshold values for a lookup table are represented as count values (weights) for the respective entries of the lookup table. For example, the following table shows count values for the four options described above:

TABLE 1

Example Lookup Table

| count value | entry |
|---|---|
| 40 | <value a1, value a2, ...> |
| 30 | <value b1, value b2, ...> |
| 20 | <value c1, value c2, ...> |
| 10 | <value d1, value d2, ...> |

The sum total of the count values (weights) indicates the range of the options. The backend system 364 can use a random number, generated between 1 and the sum total of the count values, to select one of the entries in the lookup table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a lookup table can be fixed and pre-determined. Or, the threshold values for a lookup table can vary dynamically (e.g., depending on bet level). Or, a lookup table can be dynamically selected (e.g., depending on bet level, depending on window) from among multiple available lookup tables. Different parameters or choices during game play can use different lookup tables. Or, different combinations of parameters or choices can be combined in entries of a given lookup table.

For example, Table 2, as shown below, shows N possible values for target symbols. The number of possible values for target symbols depends on implementation. For example, the possible values are possible credit values such as 50, 100, 150, 200, 250, 500, 1000, 2000, and 5000.

TABLE 2

| Value | Weight |
|---|---|
| $Val_1$ | $w_{a,1}$ |
| $Val_2$ | $w_{a,2}$ |
| $Val_3$ | $w_{a,3}$ |
| $Val_4$ | $w_{a,4}$ |
| $Val_5$ | $w_{a,5}$ |
| $Val_6$ | $w_{a,6}$ |
| . | . |
| . | . |
| . | . |
| $Val_N$ | $w_{a,N}$ |

In Table 2, possible values ($Val_i$) and corresponding weights ($w_{a,i}$) are set for window a. Different lookup tables can be used for different windows. For example, if the possible values for target symbols are the same for all windows (all lookup tables), and the target symbols are selectively transferred in a downward direction. Weights for possible values of target symbols in reels of a first window, second window, and third window can be set so that the average value of target symbols is different between the three windows. The weights $w_{1,d}$ for window 1 can be set to have higher values than the weights $w_{2,d}$ for window 2, which can be set to have higher values than the weights $w_{3,d}$ for window 3. In this way, the average value of target symbols can be set to be highest in window 1 and lowest in window 3. In some example, implementations in which a full stack of target symbols is transferred in a downward direction, the average value of target symbols for reels of window 1 is about 900, the average value of target symbols for reels of window 2 is about 250, and the average value of target symbols for reels of window 3 is about 100. Thus, using different lookup tables for possible values of target symbols for different windows, RTP and/or volatility can be controlled between the different windows. In general, such lookup tables can be used to balance RTP and/or volatility depending on the direction of transfer of target symbols (e.g., so that RTP and/or volatility are comparable in each of the windows).

For example, in some example implementations, the example game processing architecture 350 implements a game processing pipeline for a process that performs any of the multi-level features described below. In response to a start condition, the game play UI 354 (or bonus game play UI 358) makes one or more RNG calls to the game processing backend system 364. In response, the backend system 364 performs various operations. Using a gaming RNG 368, the RNG engine 366 generates one or more random numbers, which are passed to the RNG conversion engine 370. Using the gaming RNG 368, the RNG engine 366 determines more random numbers, which the RNG conversion engine 370 uses (along with one or more of the lookup tables 372A . . . 372N) to determine symbol stop positions for the respective reels of the subset of active reels. The backend system 364 can also determine the outcome of the process (e.g., calculating whether any win conditions exist on pay lines). Eventually, the game play UI 354 (or bonus game play UI 358) stops the spinning of the reels in the subset of active reels at the symbol stop positions returned for the respective reels. Finally, the game play UI 354 (or bonus game play UI 358) outputs an indication of the outcome of the process.

In certain embodiments, the determined sub-feature is activated and a resulting outcome is selected (e.g., using an RNG (such as gaming RNG 368) that applies a lookup table). Subsequently, a display of the determined result of the sub-feature is activated. A determination can then be made as to whether the sub-feature selected is a terminating event (or sub-feature), which indicates that the bonus feature is to be terminated, and a return to the base reel game (after awarding any bonus feature credits are awarded) is to be executed. If a terminating event (sub-feature) has not been selected, then the procedure continues where one or more modifications are made to the primary wheel, which awards the sub-features. For instance, one or more of the available sub-features are altered to provide greater (enhanced) awards. In particular embodiments, the upgrades include upgraded multipliers for the credit awarding sub-features and/or upgraded reel strips for one or more sub-features.

In particular embodiments, one of the selected sub-features can be a reel-spin feature that implements one or more re-spin operations. To determine whether a re-spin operation occurs, the reel-spin feature can use a random selection of a credit threshold to represent a minimum award value the reel-spin feature should achieve before exiting out of the feature. The credit threshold can be determined from, for example, by gaming RNG 368 and/or one or more lookup tables 372A-372N). In other words, the reel-spin feature can perform at least one re-spin of the reels until the payout for the reel-spin feature meets or exceeds the determined credit threshold. In certain embodiments, the credit threshold is selected to achieve (on average) a certain average award. In doing so, the credit threshold acts as a mechanism to achieve any relevant regulatory requirements. The credit threshold may be selected, for instance, using a variety of probabilities within a range of possible outcomes (e.g., using weights from lookup tables), both designed to generate over time an average award. This approach can cluster wins around a desired average award.

As described below, during the sub-feature, if the actual award amount is less than the credit threshold value, then the sub-feature can perform at least one re-spin (e.g., using gaming RNG 368 and/or one or more lookup tables 372A-372N) to ensure that the actual award exceeds the credit threshold value. Still further, in certain embodiments, the re-spin process can engage one or more, but not all, of the reels to achieve the credit threshold value based on a re-spin criterion (e.g., whether the initial reel spin for a selected reel produced a symbol with an associated award). And, in some embodiments, when a re-spin is triggered, the underlying reel strip can be modified (e.g., to provide enhanced awards and/or increased probabilities that the re-spun reel will achieve a reel-strip symbol with an associated award). The credit threshold value can be dynamically set for each activation of the sub-feature; in other words, the threshold value can vary each time a player enters the sub-feature.

Figure 4:
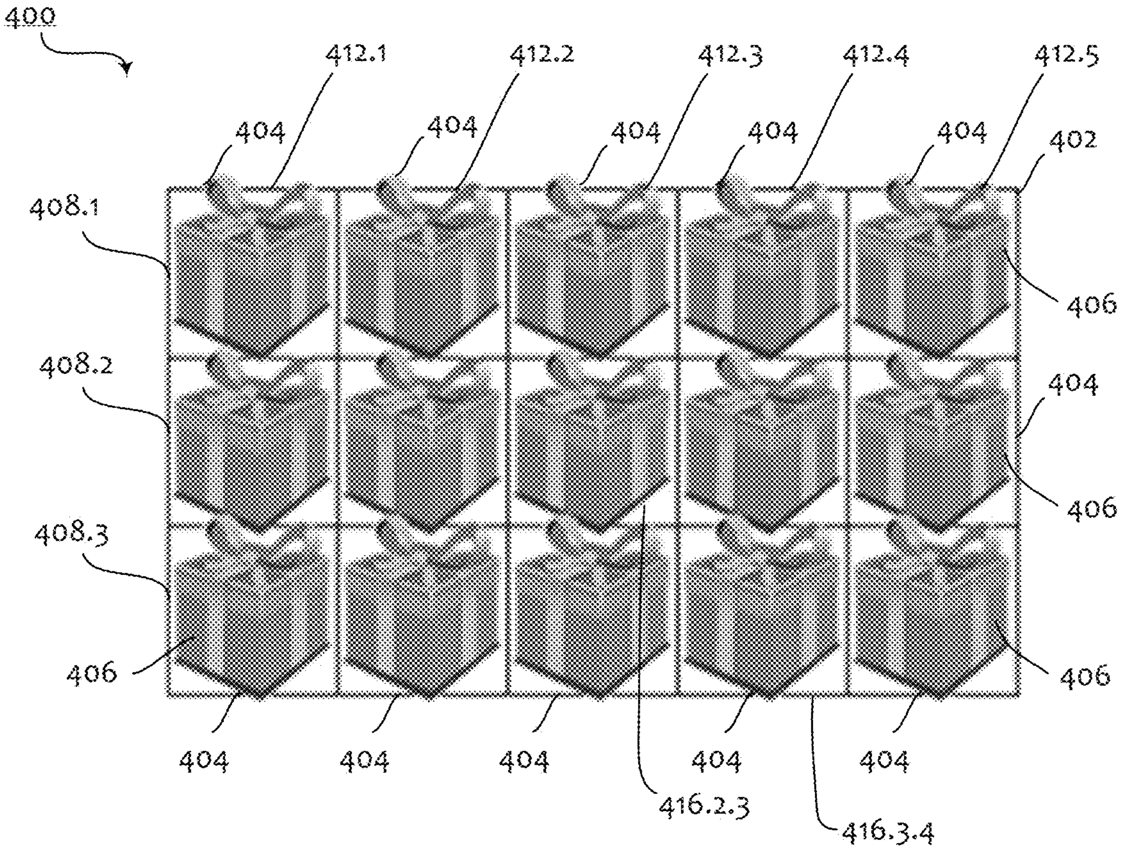
FIG. 4 illustrates an embodiment of a grid pick gaming grid displayed having a plurality of grid positions occupied with wrapped present symbols that is displayable on a gaming machine.

FIG. 4 illustrates an embodiment of a grid pick gaming grid 400 displayed having a 3×5 grid 402 comprising a plurality of grid positions 404 occupied with wrapped present symbols 406 that is displayable on a gaming machine. In some embodiments, the grid pick gaming grid 400 may be displayed on a graphical user interface, such as, for example, primary game display 240, secondary game display 242, or topper display 216. The grid pick gaming grid 400 may be presented as a base game. However, in other embodiments, the grid pick gaming grid 400 may be triggered as a feature game from a base game.

The grid positions 404 are arranged in this embodiment in a plurality of rows and columns. In the embodiment, the grid 402 has three rows—first row 408.1, second row 408.2, and third row 408.3, and five columns—first column 412.1, second column 412.2, third column 412.3, fourth column 412.4, and fifth column 412.5. Each grid position is identified by its row and column. For example, grid position in the second row 408.2 and the third column 412.3 is identified as grid position 416.2.3. For another example, grid position in the third row 408.3 and the fourth column 412.4 is identified as grid position 416.3.4. Thus, in the embodiment, the grid 402 has fifteen grid positions, and each of the grid positions 404 displays a wrapped present symbols 406 to represent populated grid positions 404 waiting to be selected to reveal its associated symbol.

Once a grid position 404 is selected, the game controller 202 (of FIG. 2A) through the RNG 212 selects a plurality of grid symbols to populate the grid positions 404, for example, with the game play UI 354 (of FIG. 3B) making one or more RNG calls to the game processing backend system 364, and RNG engine 366 generating one or more random numbers, as discussed above. The plurality of grid symbols may include at least a first symbol type including blank symbols 414 and a second symbol type including diamond symbols 418. It should be noted that blank symbols 414 and diamond symbols 418 are used for illustrative purposes only, and other symbols can also be designated as the blank symbols 414 or the diamond symbols 418. In some embodiments, the diamond symbols 418 may be associated with a plurality of prizes and/or jackpots. In some embodiments, weighting factors such as time of operation of the grid pick mechanic without any wins, player history, an amount of time that the player has played the grid pick game, a number of times that the player has frequented a casino, a time of the day, and the like, may cause the game controller 202 to reveal the diamond symbols 418 more often than the blank symbols 414. In other embodiments, the game controller 202 may randomly associate different prizes with the diamond symbols. Further, the grid positions 404 may be populated with a first number of diamond symbols 418, and a less second number of blank symbols 414. For example, the grid positions 404 may include eight diamond symbols 418 and seven blank symbols 414.

When the grid positions 404 have been randomly populated, the game controller 202 may receive one or more selections of the grid positions 404 to reveal their respective symbols, via, for example, the primary game display 240. In some embodiments, the game controller 202 may determine a number of grid positions that the player is allowed to select. For example, in some embodiments, the game controller 202 may increase the number of grid positions to be selectable based on an amount of wager placed. In other embodiments, the number of grid positions 404 selectable may be fixed or designated, e.g., eight out of the fifteen grid positions. In some other embodiments, the controller 202 may prohibit selection of any of remaining unselected grid positions beyond a certain number of grid position selections. As shown, eight different selections on the grid 402 may be selected. After the determined number of grid positions in the grid 402 have been selected by, for example, a player, the game controller 202 may control a display, e.g., the primary game display 240 of FIG. 2A, to reveal the symbols populated at the grid positions 404 that have been selected.

Figure 5:
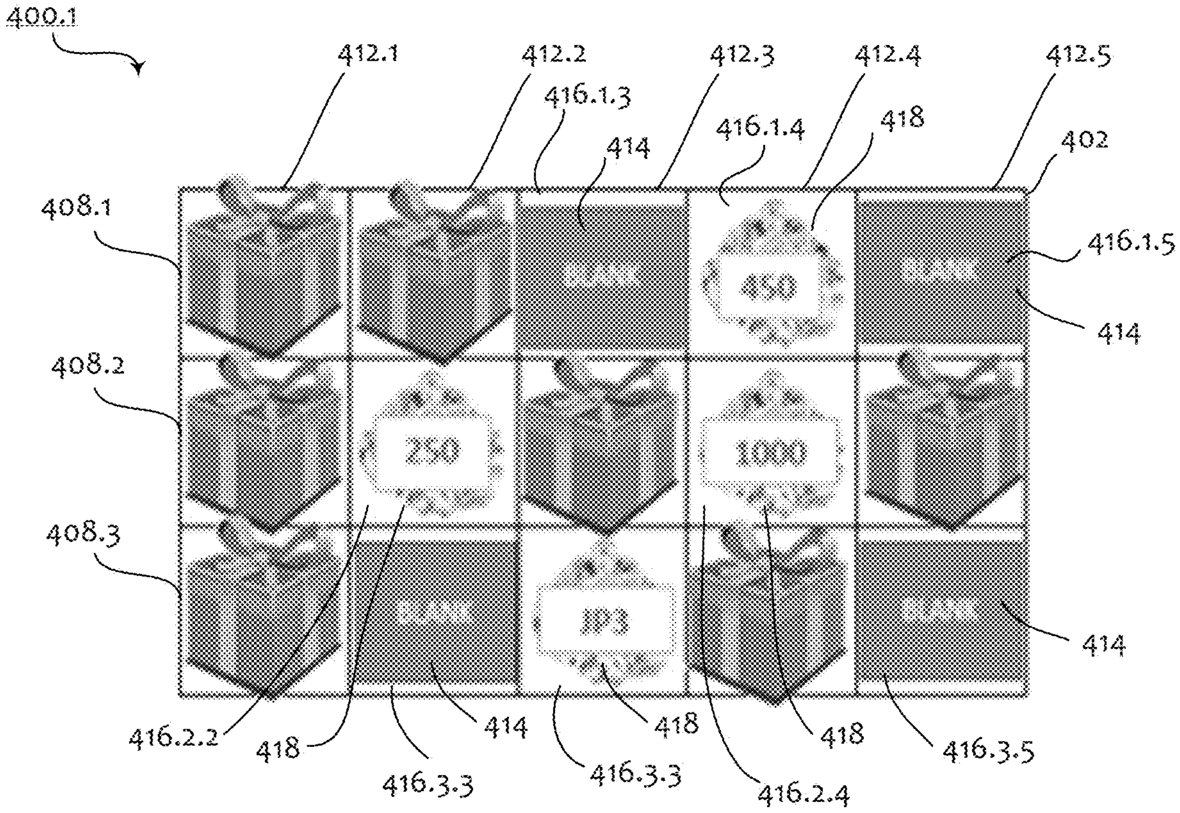
FIG. 5 illustrates an embodiment of a grid pick gaming grid displayed having a plurality of grid positions occupied with some wrapped present symbols and others with some of the grid positions of FIG. 4 selected to reveal a plurality of blank symbols and diamond symbols.

FIG. 5 illustrates an embodiment of a grid pick gaming grid 400.1 displayed having a plurality of grid positions 404 of FIG. 4 occupied with wrapped present symbols 406 and others with some of the grid positions of FIG. 4 selected to reveal a plurality of blank symbols 414 and diamond symbols 418. As shown, eight grid positions have been selected-grid position 416.2.2, grid position 416.3.2, grid position 416.1.3, grid position 416.3.3, grid position 416.1.4, grid position 416.2.4, grid position 416.1.5, and grid position 416.3.5. Of the eight grid positions selected, four of the grid positions selected reveal diamond symbols 418 with different prizes to be awarded. Specifically, grid position 416.2.2 reveals an award of 250 credits, grid position 416.3.3 reveals an award of a jackpot, grid position 416.1.4 reveals an award of 450 credits, and grid position 416.2.4 reveals an award of 1000 credits. Conversely, four of the grid positions selected reveal blank symbols. Specifically, grid position 416.3.2, grid position 416.3.3, grid position 416.1.5, and grid position 416.3.5 reveal blank symbols. If a blank symbol is revealed, no prize is awarded.

Figure 6:
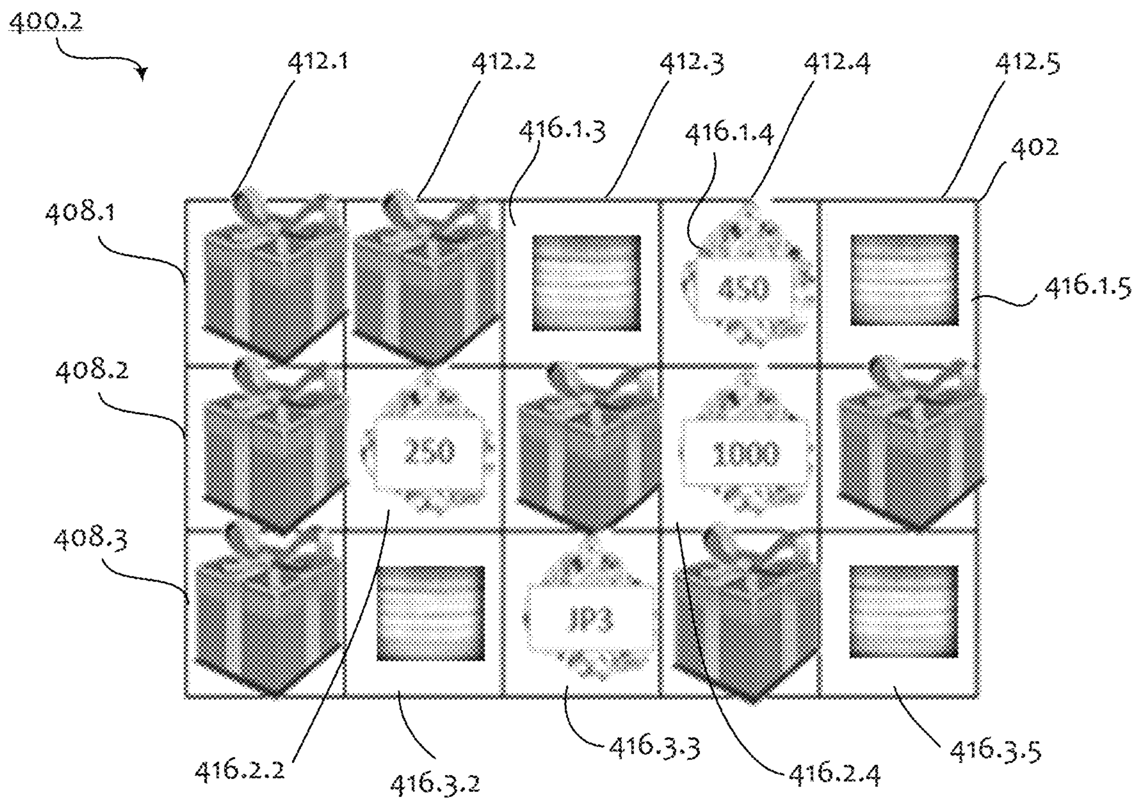
FIG. 6 illustrates an embodiment of a grid pick gaming grid displayed having transformed grid pick game grid with grid positions of FIG. 5 revealing blanks symbols being transformed into spinning reels.

FIG. 6 illustrates an embodiment of a grid pick gaming grid 400.2 displayed having grid positions of FIG. 5 displaying blanks symbols 414 being transformed into reels that may be spun. In some embodiments, the reels are independent reel strips that may also be independently spun. As shown, grid position 416.3.2, grid position 416.3.3, grid position 416.1.5, and grid position 416.3.5 are considered eligible for re-spins. As such, grid position 416.3.2, grid position 416.3.3, grid position 416.1.5, and grid position 416.3.5 are transformed into a plurality of individual reels, respectively.

In some embodiments, the individual reels have the same reel strips that have a plurality of chance symbols selectable to provide the player with a number of second chances to win a prize, even when the grid position has previously displayed a blank symbol. In other embodiments, the individual reels have different reel strip lengths, symbol position sizes and varying reel strip symbols. The number of second chances provided for an individual reel may be fixed, e.g., three times. In other embodiments, however, the number of second chances provided for an individual reel may be randomly selected. In still other embodiments, the number of second chances provided for an individual reel may be determined based at least in part on contributing factors that may be weighted, for example, as previously described with reference to FIG. 3B. In the embodiment shown, the chance symbols are the grid symbols thus including blank symbols 414 and diamond symbols 418 with prizes.

Each re-spin of the determined number of re-spins will utilize a call to the RNG 212 of FIG. 2A, and/or gaming RNG 368 of FIG. 3B and/or one or more lookup tables 372A-372N, to determine a chance symbol to replace the blank symbol 414. In some embodiments, every re-spin for the blank symbols 414 may represent a separate or an independent reel with a designated weight for the independent reel, so as to balance a predetermined RTP and/or maintain a hit rate of a jackpot. For example, when both a first grid position and a second grid position respectively display blank symbols, a first re-spin and a second re-spin at the first grid position and the second grid position are respectively requested. When the first re-spin lands a diamond symbol while the second re-spin lands a blank symbol, a third re-spin at the second grid position may be requested. In a result, a further blank symbol is more likely to land (or a diamond symbol is less likely to land) in the second grid position for the third re-spin or subsequent re-spins to achieve the predetermined RTP and/or establish a target hit rate of a jackpot. Thus, the designated weight may be based on a number of diamond symbols already landed on and/or displayed, whereas the number of diamond symbols that have landed and/or displayed increases, the less likely a diamond symbol will land on subsequent re-spins. In the embodiment shown, re-spins of each of the blank symbols occur in sequence of one reel or one grid position at a time. In other embodiments, re-spins of all of the blank symbols may occur simultaneously, for example.

Figure 7:
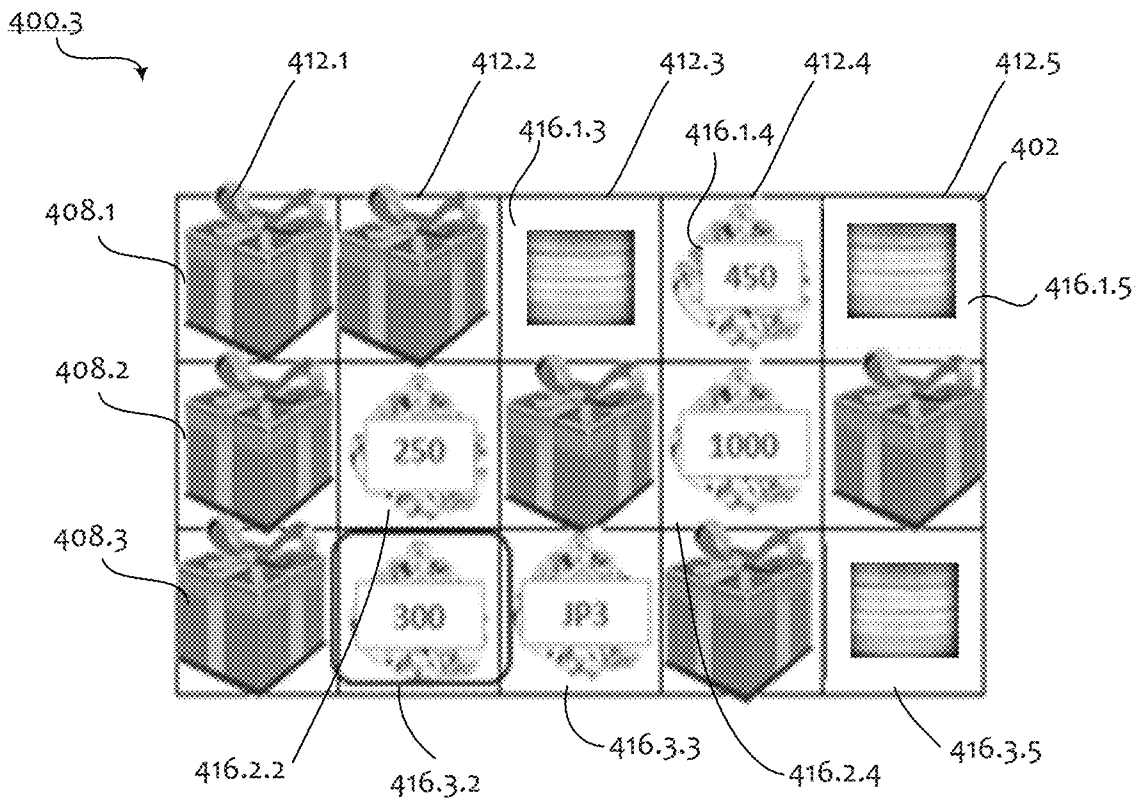
FIG. 7 illustrates an embodiment of a grid pick gaming grid displayed having second transformed grid pick game grid displaying one of the spinning reels stopped to reveal a diamond symbol.

FIG. 7 illustrates an embodiment of a grid pick gaming grid displayed having second transformed grid pick gaming grid 400.3 of FIG. 6 displaying one of the reels stopped after spinning to reveal a diamond symbol 418 at grid position 416.3.2. As shown, while the reels at grid position 416.3.3, grid position 416.1.5, and grid position 416.3.5 are still spinning, the reel at grid position 416.3.2 comes to a stop, and reveals a diamond symbol 418 with an award of 300 credits. Since grid position 416.3.2 has been transformed into a diamond symbol with 300 credits, the determined number of re-spins is reset so that the reels at grid position 416.3.3, grid position 416.1.5, and grid position 416.3.5 may be spun more, thus providing more second chances of winning. After the re-spin feature ends, grid positions that were not picked are revealed to the player in a disabled state as further described.

Figure 8:
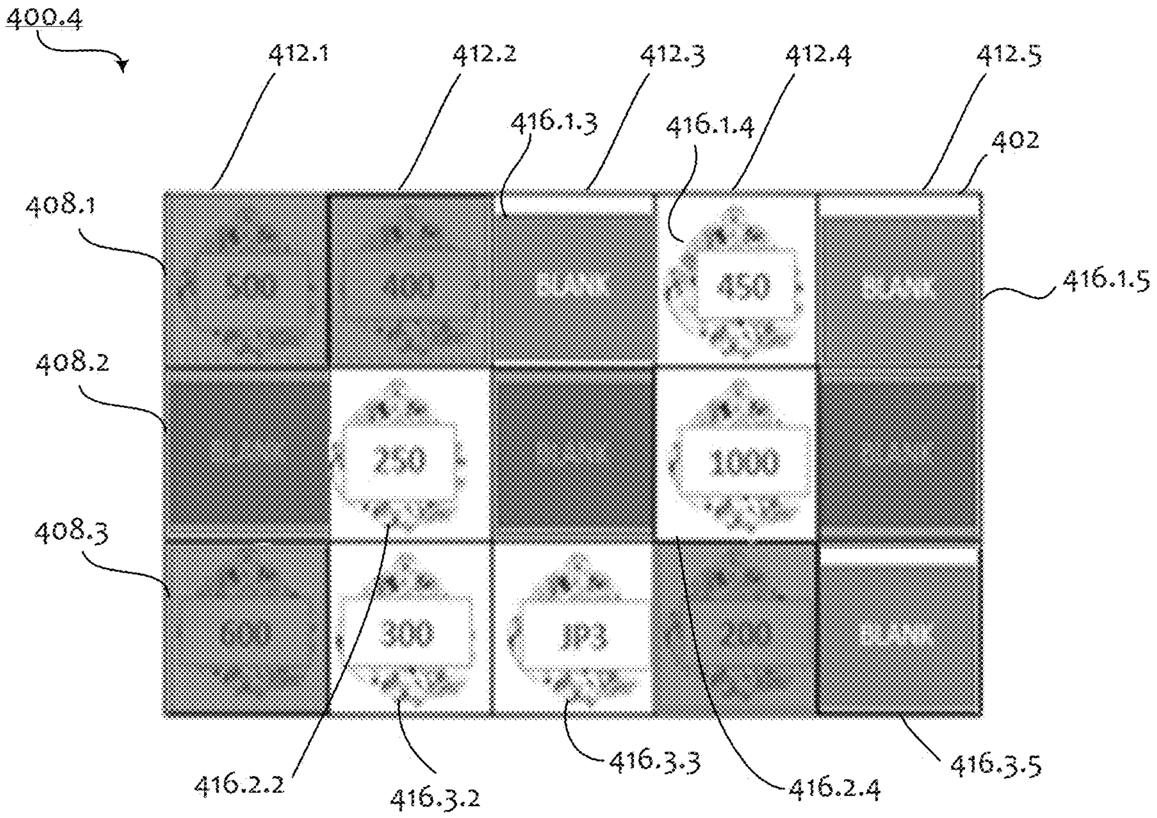
FIG. 8 illustrates an embodiment of a grid pick gaming grid displayed to reveal unselected symbol positions at a plurality of grid positions.

FIG. 8 illustrates an embodiment of a grid pick gaming grid 400.4 of FIG. 7 displayed to reveal unselected symbol positions at a plurality of grid positions in a disabled or inactive state. Such a reveal of the unselected symbol positions may reveal potential wins that could have occurred had unselected symbol positions been selected. By way of example, the pick grid jackpot could be awarded on the selection of a set number of diamond symbols 418 (e.g., selecting 8 diamond symbols that would correspond to a jackpot prize). Such a full grid reveal reveals where other diamond symbols 418 could have been potentially selected to win the jackpot prize. As shown in FIG. 8, the reels at grid position 416.3.3, grid position 416.1.5, and grid position 416.3.5 may still be re-spun to reveal further blank symbols 414, diamond symbols 418 or other symbols populated on a reel. The full grid reveal may occur between re-spins, during re-spins or at the completion of all re-spins.

Further, the unselected symbols are shaded or otherwise designated to indicate the grid positions are disabled and unselected. The plurality of unselected grid positions includes grid position 416.1.1 that shows a non-awarded credit of 500 credits, grid position 416.3.1 that shows a non-awarded credit of 600 credits, grid position 416.1.2 that shows a non-awarded credit of 400 credits, and grid position 416.3.4 which shows a non-awarded credit of 200 credits. The plurality of unselected grid positions also includes grid position 416.2.3 and grid position 416.2.5 reveal blank symbols. Thus, for example, FIG. 8 also shows that if grid position 416.1.1, grid position 416.3.1, grid position 416.1.2, and grid position 416.3.4 had been selected instead, the jackpot prize in grid position 416.3.3 could have been awarded because the selection of a total eight diamond symbols 418 would have corresponded to the award of jackpot prize.

Figure 9A:
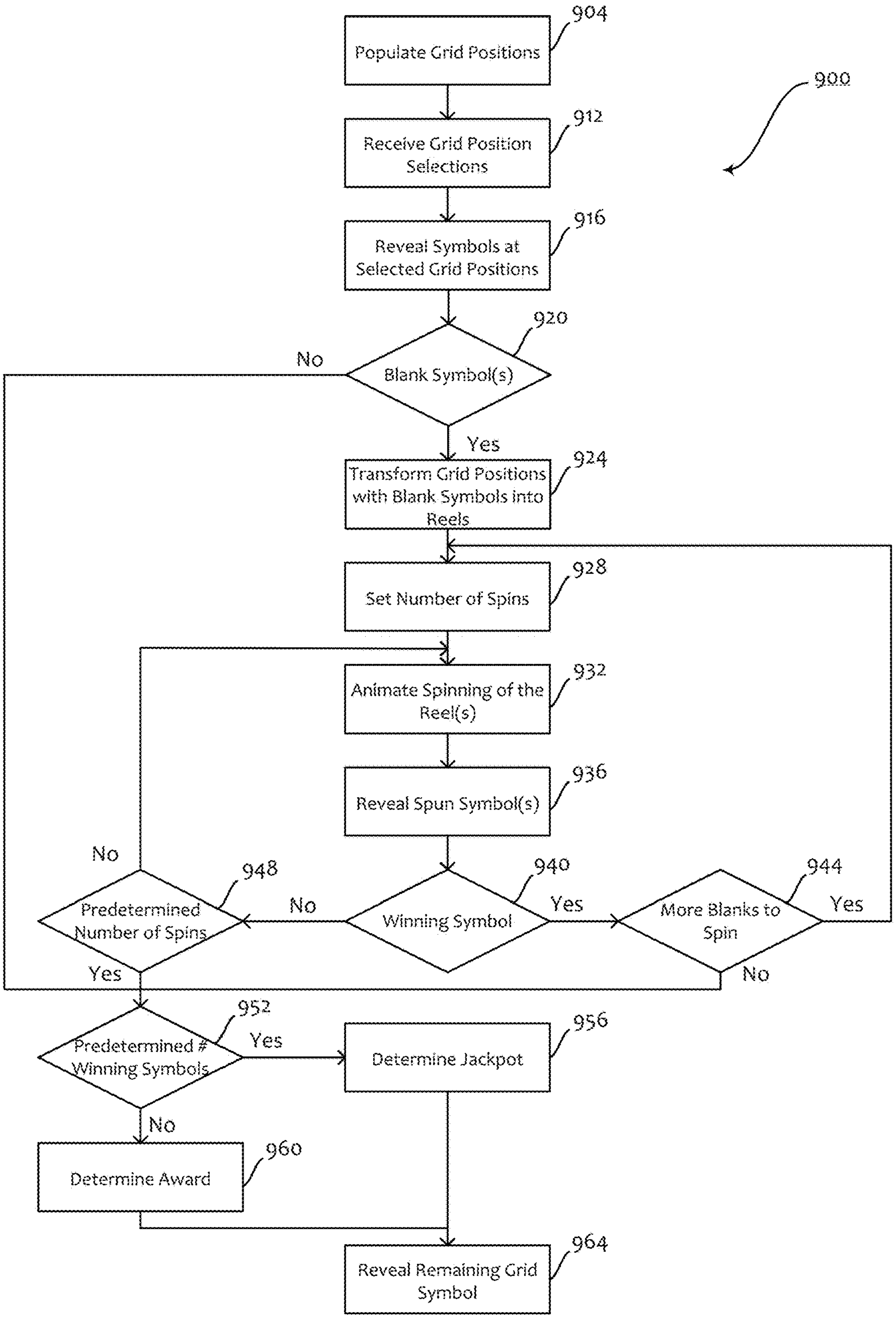
FIG. 9A is an example flowchart of a first operational process of the enhanced grid pick selection mechanic on an interactive electronic gaming machine.

FIG. 9A is an example flowchart of a first operational process 900 of the enhanced grid pick selection mechanic on an interactive electronic gaming machine. At step 904, the first operational process 900 randomly populates via the game controller 202 of FIG. 2A the grid positions 404 of FIG. 4 with the grid symbols, e.g., wrapped present symbols 406, for example, with the game play UI 354 (of FIG. 3B) making one or more RNG calls to the game processing backend system 364, and RNG engine 366 generating one or more random numbers, as discussed above. At step 912, the first operational process 900 receives one or more selections of the grid positions 404 as described. At step 916, the first operational process 900 causes the grid 402 of FIG. 4 to reveal the selected symbols at the plurality of grid positions.

At step 920, the first operational process 900 determines if any of the symbols revealed includes a first symbol (e.g., a blank symbol) 414. If the first operational process 900 determines that at least one of the symbols revealed includes a blank symbol 414, the first operational process 900, at step 924, the grid position 404 transforms blank symbol 414 into a reel strip that may be spun, similar to the spinning reel illustrated at grid position 416.1.3 of FIG. 6. As described with respect to FIG. 6, the reel may include a reel strip that has the plurality of chance symbols. In some embodiments, the chance symbols are the grid symbols. That is, the chance symbols also include blank symbols 414 and diamond symbols 418.

At step 928, the first operational process 900 determines a number of spins of the reels that may be carried out. In some embodiments, the number of spins or re-spins may be predetermined. In other embodiments, the number of spins or re-spins may be randomly determined, for example, via gaming RNG 368 and/or one or more lookup tables 372A-372N. At step 932, the first operational process 900 animates the reels to spin on a graphical user interface, via the game controller 202. At step 936, when the spinning of a reel comes to a stop, a symbol randomly selected from the chance symbols is displayed or revealed at a respective grid position 404. At step 940, the first operational process 900 determines if a winning symbol is revealed at the respective grid position 404. If the first operational process 900 determines that a winning symbol is revealed at the respective grid position at step 940, the first operational process 900 determines at step 944 if there are more reels corresponding to the blank symbols to be spun. However, if the first operational process 900 determines that no winning symbol is revealed at the respective grid position at step 940, the first operational process 900 proceeds to determine at step 948 whether the reels have been spun the predetermined number of times.

If the first operational process 900 determines at step 948 that the reels have not been spun the predetermined number of times, the first operational process 900 proceeds to repeat step 932. If the first operational process 900 determines at step 944 that there are more reels corresponding to the blank symbols to be spun, the first operational process 900 resets the number of re-spins available at step 928, and proceeds to repeat step 932 for the remaining grid positions with blank symbols.

However, if the first operational process 900 determines at step 920 that there are no blank symbols revealed in the grid 402, or at step 948 that the reels have been spun for the predetermined number of times, or at step 944 that there are no more reels corresponding to the blank symbols to be spun, the first operational process 900 proceeds to determine if all of the grid positions selected include diamond symbols at step 952. Although not shown, in some embodiments, when the first operational process 900 determines that one or more winning symbols are revealed at the respective grid position at step 940, the first operational process 900 may reset the number of spins that blank symbols 414 may be re-spun. If the first operational process 900 determines at step 952 that all of the grid positions selected include diamond symbols, the first operational process 900 proceeds to step 956 to determine an amount of jackpot to award. If the first operational process 900 determines at step 952 that not all of the grid positions selected include diamond symbols, the first operational process 900 proceeds to step 960 to determine an amount of award to present for the winning symbols that have been revealed. The first operational process 900 at step 964 causes the remaining grid positions, that is, the plurality of unselected grid positions to reveal their respective symbols in an inactive state and ends the first operational process 900.

Figure 9B:
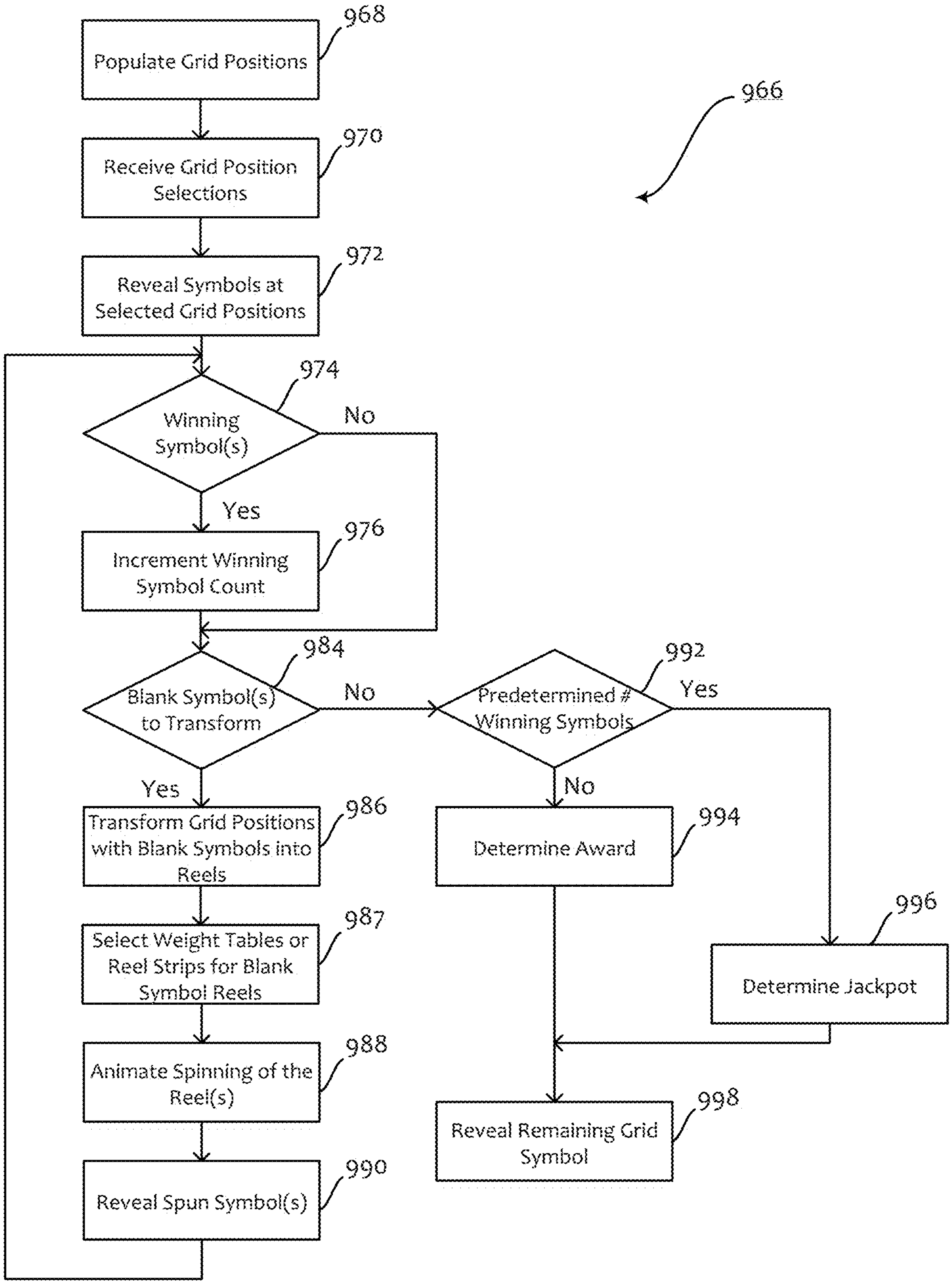
FIG. 9B is an example flowchart of a second operational process of the enhanced grid pick selection mechanic on an interactive electronic gaming machine.

FIG. 9B is an example flowchart of a second operational process 966 of the enhanced grid pick selection mechanic on an interactive electronic gaming machine. The second operation process 966 presents an alternative and/or a concurrent process that may be executed in parallel to the first operational process 966. At step 968, the second operational process 966 randomly populates via the game controller 202 of FIG. 2A the grid positions 404 of FIG. 4 with the grid symbols, e.g., wrapped present symbols 406, for example, with the game play UI 354 (of FIG. 3B) making one or more RNG calls to the game processing backend system 364, and RNG engine 366 generating one or more random numbers, as discussed above. At step 970, the second operational process 966 receives one or more selections of the grid positions 404 as described. At step 972, the second operational process 966 causes the grid 402 of FIG. 4 to reveal the selected symbols at the plurality of grid positions.

At step 974, the second operational process 966 determines if any of the symbols revealed includes one or more winning symbols (e.g., diamond symbols 418). If the second operational process 966 determines that at least one of the symbols revealed includes one or more diamond symbols 418, the second operational process 966, at step 976, increments a winning symbol count. The second operational process 966 determines if any of the grid positions that display blank symbols 414 need to be transformed at step 984. If the second operational process 966 determines one or more of the grid positions that display blank symbols 414 are to be transformed, the second operational process 966, at step 986, transforms the blank symbols 414 into reel strips that spin, similar to the spinning reel illustrated at grid position 416.1.3 of FIG. 6. At step 987, the second operational process 966 may conditionally determine or select different weight tables and/or reel strips for use with the reel strips to be spun at grid positions having the blank symbols 414. In some embodiments, the second operational process 966 may determine, adjust, or select different weights, weight tables and/or reel strips as the winning symbol count increases. For example, at step 987, the second operational process 966 utilizes a different weight table when the winning symbol count is five compared to when the winning symbol count is six. The weight table associated with a winning symbol count of six would be weighted to have a higher probability to land on a blank symbol 414 than the weight table associated with a winning symbol count of five. In another example, rather than utilizing multiple weight tables, the second operational process 966 utilizes a single weight table setup with weights that increase the probability of landing on a blank symbol 414 as the winning symbol count increases. Additionally, or alternatively, as the winning symbol count increases, the second operational process 966 could switch out reel strips that include more blank symbols 414 to perform the re-spin of grid positions 404 that previously landed on a blank symbol 414.

At step 988, the second operational process 966 animates the transformed reels to spin on the graphical user interface, via the game controller 202 with an increased weight for the blank symbols 414. At step 990, when the spinning of a reel comes to a stop, a symbol randomly selected from the chance symbols is displayed or revealed at a respective grid position 404. The second operational process 966 then returns to step 974.

However, if the second operational process 966 determines at step 984 that there are no blank symbols revealed in the grid 402, second operational process 966 proceeds to determine if all of the grid positions selected include diamond symbols at step 992. If the second operational process 966 determines at step 984 that all of the grid positions selected include diamond symbols, the fi second operational process 966 proceeds to step 996 to determine an amount of jackpot to award. If the second operational process 966 determines at step 992 that not all of the grid positions selected include diamond symbols, the second operational process 966 proceeds to step 994 to determine an amount of award to present for the winning symbols that have been revealed. The second operational process 966 at step 998 causes the remaining grid positions, that is, the plurality of unselected grid positions to reveal their respective symbols in an inactive state, and ends the second operational process 966.

Figure 10:
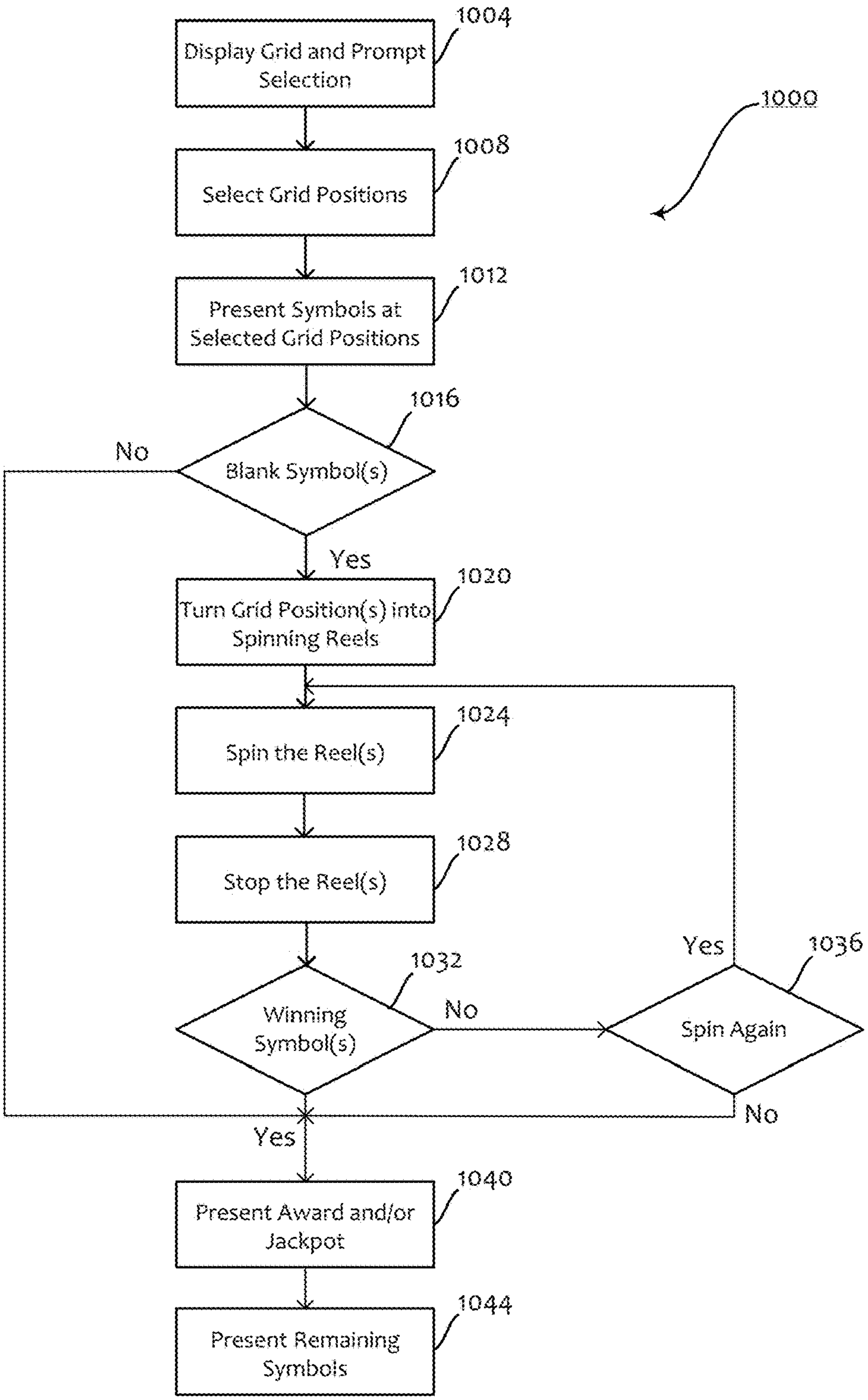
FIG. 10 is an example flowchart of an interactive process of the enhanced grid pick selection mechanic on an interactive electronic gaming machine.

FIG. 10 is an example flowchart of an interactive process 1000 of the enhanced grid pick selection mechanic as viewed by a player on an interactive electronic gaming machine. In many aspects, the interaction process 1000 is similar to the first operational process 900 (of FIG. 9A) or the second operation process 966 (of FIG. 9B). For example, at step 1004, the interactive process 1000 displays a grid, such as, for example, grid 400 (of FIG. 4) and prompts the player to select a number of grid positions on the grid on a graphical user interface. The player then selects the number of grid positions at step 1008 via the graphical user interface.

The interaction process 1000, at step 1012, unveils symbols at the grid positions selected at step 1008. When the symbols unveiled include one or more blank symbols, as determined at step 1016, the grid positions that include blank symbols are turned into a number of spinning reels at step 1020, to afford the player one or more second chances of winning a jackpot or more awards. Similar to the first operational process 900 (of FIG. 9A) or the second operation process 966 (of FIG. 9B), each spinning reel may include a reel strip that has the plurality of chance symbols including at least the blank symbols 414 and the diamond symbols 418. As such, the spinning reels are spun at step 1024. In some embodiments, all spinning reels are spun simultaneously. In other embodiments, the spinning reels are spun consecutively. When the spinning reels come to a stop, whether simultaneously or individually, at step 1028, the interaction process 1000 determines if the spinning reels display one or more winning symbols at step 1032. If there are remaining blank symbols, the interaction process 1000 may re-spin one or more of the spinning reels at step 1036, as described above.

On the other hand, after the interaction process 1000 has finished spinning all spinning reels, and the interaction process 1000 determines that the spinning reels display one or more winning symbols at step 1032, the interaction process 1000 presents through the graphical user interface an award and/or jackpot obtained by the player at step 1040. As discussed, with respect to the first operational process 900 (of FIG. 9A) or the second operation process 966 (of FIG. 9B), if the graphical user interface displays a predetermined number of diamond symbols, and at least one of the diamond symbols includes a jackpot, the interaction process 1000 awards the jackpot. If the predetermined number of diamond symbols does not include a jackpot, the interaction process 1000 awards credit prizes on the diamond symbols. The interaction process 1000 at step 1044 presents the plurality of unselected grid positions to reveal their respective symbols in the inactive state, and ends the interaction process 1000.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system operable to meet a designated RTP, the gaming system comprising:

at least one server comprising at least one processor and a memory storing a set of symbol including winning symbols and non-winning symbols, and a plurality of instructions executable to cause the processor to access the memory for a plurality of symbols from the set of symbols selected for a game outcome based on random numbers generated from a random number generator; and an end user device operable to be coupled to the at least one server, and comprising a device processor to at least:

receive the game outcome from the at least one server, cause a plurality of grid positions to be graphically populated with the plurality of symbols received through the game outcome, interactively receive a first selection corresponding to a first subset of grid positions, in response to the first subset of grid positions having one or more grid positions being populated with a first non-winning symbol, graphically transition each of the one or more grid positions to a spinning reel having at least a first winning symbol, interactively receive a second selection among the one or more grid positions within the first subset of grid positions, cause the spinning reel corresponding to the second selection to graphically spin and to graphically stop at the first winning symbol to meet the designated RTP, and generate a payout determined from the first selection and the second selection.

2. The gaming system of claim 1, wherein the end user device comprises one of an electronic gaming machine, a gaming device, a tablet device, a cellular phone, a smart phone, and a handheld device.

3. The gaming system of claim 1, wherein the spinning reel is associated with a designated weight.

4. The gaming system of claim 3, wherein the spinning reel is a first spinning reel, wherein a different grid position is populated with the first non-winning symbol, and wherein the device processor determines the designated weight for a second spin based on whether the first spinning reel is to stop on the first winning symbol and a number of the winning symbols in the first selection.

5. The gaming system of claim 1, wherein the first non-winning symbol comprises a blank symbol.

6. The gaming system of claim 1, wherein the device processor determines a number of times for spinning the spinning reel in the second selection based on a number of the first winning symbol selected in the first selection.

7. The gaming system of claim 1, wherein the first winning symbol carries at least one of a credit value and a jackpot.

8. A method of providing a second chance award in a gaming system to meet a designated RTP, the gaming system having at least one server comprising at least one processor and a memory storing a set of symbol including winning symbols and non-winning symbols, and an end user device operable to be coupled to the at least one server, the method comprising:

transmitting, from the at least one server, data indicative of a game outcome including a plurality of symbols selected from the set of symbols based on random numbers generated from a random number generator;

animating a set of grid positions on the end user device being populated with the plurality of symbols received from the at least one server;

interactively receiving at the end user device in a first selection corresponding to a first subset of grid positions among the set of grid positions;

in response to one or more grid positions among the first subset of grid positions being populated with a first non-winning symbol, animating each the one or more grid positions being transitioned into a spinning reel that comprises a first winning symbol;

in response to a first spinning reel associated with a first grid position in the first selection having been interactively selected in a second selection, animating the first spinning reel being spun and stopped at the first winning symbol to meet the designated RTP; and revealing the plurality of symbols in the set of grid positions outside the first selection after completing the second selection to meet the designated RTP.

9. The method of claim 8, further comprising crediting a jackpot when a number of game symbols associated with the first winning symbol in the first selection reaches a predetermined maximum number corresponding to the jackpot.

10. The method of claim 8, wherein the first spinning reel is associated with a first designated weight, and a second grid position comprises the first non-winning symbol, further comprising animating the second grid position being transitioned into a second spinning reel, and determining a second designated weight for the second spinning reel based on whether the first spinning reel is to stop on the first non-winning symbol and a number of the first winning symbol in the first selection.

11. The method of claim 10, further comprising spinning the second spinning reel after the spinning reel is spun.

12. The method of claim 8, further comprising determining a number of times for the second selection based on a number of the first winning symbol in the first selection.

13. The method of claim 8, wherein the first winning symbol comprises at least one of a credit value and a jackpot.

14. A non-transitory computer-readable medium comprising instructions operable to generate a second chance award in an end user device to meet a designated RTP in a remote gaming system including at least one server and the end user device, and the instructions, which, when executed, cause a processor to perform the steps of:

animating a set of grid positions on the end user device being populated with a plurality of game symbols received as a game outcome transmitted from the at least one server;

interactively receiving in a first selection at the end user device a plurality of grid positions selected among the set of grid positions;

in response to the first selection including one or more non-winning symbols in respective grid positions, graphically transitioning the respective grid positions into respective spinning reels, each of respective spinning reels comprising a winning symbol;

interactively receiving in a second selection at the end user device a first grid position having a transitioned spinning reel selected among the respective grid positions;

animating at the end user device the transitioned spinning reel being spun and stopped to reveal the winning symbol to meet the designated RTP; and animating at the end user device the plurality of game symbols selected in the set of grid positions outside the first selection after completing the second selection.

15. The non-transitory computer-readable medium of claim 14, wherein the instructions, when executed, cause the processor to perform the step of crediting a jackpot when a winning symbol count in the first selection reaches a predetermined maximum number corresponding to the jackpot.

16. The non-transitory computer-readable medium of claim 14, wherein the transitioned spinning reel further comprises a first non-winning symbol.

17. The non-transitory computer-readable medium of claim 16, wherein a different grid position is populated with the first non-winning symbol, and wherein the instructions, when executed, cause the processor to perform the steps of transitioning the different grid position into a different spinning reel having another stop at the winning symbol, and spinning the transitioned spinning reel and the different spinning reel simultaneously.

18. The non-transitory computer-readable medium of claim 16, wherein the transitioned spinning reel is associated with a first designated weight, a second grid position comprises the first non-winning symbol, wherein the instructions, when executed, cause the processor to perform the steps of transitioning the second grid position into a second spinning reel, and determining a second designated weight for the second spinning reel based on whether the transitioned spinning reel is to stop on the first non-winning symbol and a winning symbol count in the first selection.

19. The non-transitory computer-readable medium of claim 14, wherein the winning symbol comprises at least one of a credit value and a jackpot.

20. The non-transitory computer-readable medium of claim 14, wherein the instructions, when executed, cause the processor to perform the step of determining a number of times for carrying out the second selection based on a number of the winning symbol in the first selection.

* * * * *